(12) United States Patent
Pusdesris et al.

(10) Patent No.: US 10,810,126 B2
(45) Date of Patent: Oct. 20, 2020

(54) CACHE STORAGE TECHNIQUES

(71) Applicant: Arm Limited, Cambridge (GB)

(72) Inventors: Joseph Michael Pusdesris, Austin, TX (US); Adrian Montero, Austin, TX (US); Klas Magnus Bruce, Leander, TX (US); Chris Abernathy, Austin, TX (US)

(73) Assignee: Arm Limited, Cambridge (GB)

( * ) Notice: Subject to any disclaimer, the term of this patent is extended or adjusted under 35 U.S.C. 154(b) by 3 days.

(21) Appl. No.: 16/139,517

(22) Filed: Sep. 24, 2018

(65) Prior Publication Data

US 2020/0097410 A1 Mar. 26, 2020

(51) Int. Cl.
*G06F 12/08* (2016.01)
*G06F 12/0862* (2016.01)
*G06F 11/34* (2006.01)
*G06F 12/0871* (2016.01)

(52) U.S. Cl.
CPC ...... *G06F 12/0862* (2013.01); *G06F 11/3409* (2013.01); *G06F 12/0871* (2013.01); *G06F 2212/1021* (2013.01)

(58) Field of Classification Search
None
See application file for complete search history.

(56) References Cited

U.S. PATENT DOCUMENTS

| | | | | |
|---|---|---|---|---|
| 2010/0030970 A1* | 2/2010 | Qureshi | ............ | G06F 12/0802 711/128 |
| 2010/0281216 A1* | 11/2010 | Patel | ............... | G06F 12/121 711/118 |
| 2011/0078382 A1* | 3/2011 | Bernstein | ............ | G06F 12/0864 711/128 |
| 2012/0079206 A1* | 3/2012 | Zhao | ................ | H04L 67/2852 711/134 |
| 2013/0151777 A1* | 6/2013 | Daly | ................. | G06F 12/126 711/122 |
| 2013/0151778 A1* | 6/2013 | Daly | ................. | G06F 12/0897 711/122 |
| 2013/0151780 A1* | 6/2013 | Daly | ................. | G06F 12/0897 711/122 |
| 2017/0357588 A1* | 12/2017 | Moyer | ................ | G06F 12/123 |
| 2017/0357596 A1* | 12/2017 | Moyer | ................ | G06F 12/121 |

* cited by examiner

*Primary Examiner* — Kevin Verbrugge
(74) *Attorney, Agent, or Firm* — Nixon & Vanderhye P.C.

(57) ABSTRACT

The present disclosure is concerned with improvements to cache systems that can be used to improve the performance (e.g. hit performance) and/or bandwidth within a memory hierarchy. For instance, a data processing apparatus is provided that comprises a cache. Access circuitry receives one or more requests for data and when the data is present in the cache the data is returned. Retrieval circuitry retrieves the data and stores the data in the cache, either proactively or in response to the one or more requests for the data. Control circuitry evicts the data from the cache and, in dependence on at least one condition, stores the data in the further cache. The at least one condition comprises a requirement that the data was stored into the cache proactively and that a number of the one or more requests is above a threshold value.

12 Claims, 12 Drawing Sheets

| Tag | Flags | Indicator | Data |
|---|---|---|---|
| 0x1FF3 | rw | L3 | 0x34432F432DF32820D32DDEF |
| 0xBB4E | w | Memory | 0xF31839FFF929DE9291AA929 |

| Cache | Accesses | Hits |
|---|---|---|
| L2 | 58 | 2 |
| L3 | 56 | 54 |

FIG. 12

CACHE STORAGE TECHNIQUES

TECHNICAL FIELD

The present disclosure relates to data storage. More particularly, it relates to caches.

DESCRIPTION

Caches are used in a memory hierarchy in order to reduce memory latency by storing frequently or recently accessed data. Caches are typically smaller and faster than the main memory and so by storing data in the caches, the data can be accessed more quickly. However, as a consequence of this, there is limited space for data to be stored and older data may have to be evicted to make way for newer data. The data could be evicted to a bigger, slower cache or to main memory in a process known as writeback.

SUMMARY

Viewed from a first example configuration, there is provided a data processing apparatus comprising: a cache; access circuitry to receive one or more requests for data and when the data is present in the cache, to return the data; retrieval circuitry to retrieve the data and to store the data in the cache, either proactively or in response to the one or more requests for the data; and control circuitry to evict the data from the cache and, in dependence on at least one condition, store the data in the further cache, wherein the at least one condition comprises a requirement that the data was stored into the cache proactively and that a number of the one or more requests is above a threshold value.

Viewed from a second example configuration, there is provided a data processing apparatus comprising: a cache comprising a plurality of storage locations distributed into a first subset, a second subset and a third subset; allocation circuitry to determine a given location into which data can be stored and determine whether to store the data at the given location in dependence on: a first policy when the given location is in the first subset; a second policy when the given location is in the second subset; and a selected policy when the given location is in the third subset; and performance monitoring circuitry to monitor a performance of the first policy and the second policy, wherein the selected policy is whichever of the first policy and the second policy has a higher performance.

Viewed from a third example configuration, there is provided data processing apparatus comprising: a cache; retrieval circuitry to retrieve data from storage circuitry and to store the data in the cache in association with an indicator of where the data was retrieved from; and control circuitry to evict the data from the cache and, in dependence on the indicator, store the data in a further cache.

Viewed from a fourth example configuration, there is provided a data processing apparatus comprising: a memory hierarchy comprising a first cache and a second cache; and request circuitry to receive a data access request for data stored in the memory hierarchy, wherein the data access request is passed through the memory hierarchy until the data access request can be satisfied; and the first cache comprises tracking circuitry to track an indication of the hit rate of the second cache.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a data processing apparatus comprising: a cache; access circuitry to receive one or more requests for data and when the data is present in the cache, to return the data; retrieval circuitry to retrieve the data and to store the data in the cache, either proactively or in response to the one or more requests for the data; and control circuitry to evict the data from the cache and, in dependence on at least one condition, store the data in the further cache, wherein the at least one condition comprises a requirement that the data was stored into the cache proactively and that a number of the one or more requests is above a threshold value.

In the above aspect, data can be retrieved into the cache. This might come about as a consequence of an explicit request for that data, e.g. originating from the processor itself, or could be part of an implicit request for data, e.g. prefetched based on the assumption that the data will be required in the near future. Caches are limited in how much data that they can store, and consequently, previously stored data needs to be evicted in order to make way for newer data. When data is evicted it can be written back to a lower level of cache. This makes the data quicker to access if it is needed again than if it had to be retrieved from main memory. However, writing back data to a lower level cache increase the traffic (bandwidth consumption) between the caches and this is wasteful if the data is not used again soon. The above aspect reflects the realisation that if data has been prefetched and only accessed a small number of times (equal to or less than the threshold) then it is unlikely that the data will be required again and so traffic can be saved by not writing back the data to a lower level of cache.

In some embodiments, the retrieval circuitry is adapted to retrieve the data from memory proactively as part of a prefetch operation. Prefetching is a process in which data is proactively fetched from memory before it is needed. Data may be proactively fetched as a consequence of being spatially proximal to data that has been explicitly requested. It is assumed that proactively fetched data will be explicitly requested in the near future and so by proactively fetching such data, it can be made available quickly when it is eventually requested.

In some embodiments, the threshold value is 0 or 1. Where data has been proactively fetched and then not explicitly accessed (e.g. before being evicted), it could be assumed that the data was proactively fetched inappropriately. This is especially true if a period of time has passed since the data has been proactively fetched such that there has been opportunity for the data to be explicitly accessed. Similarly, where data has been proactively fetched and explicitly accessed only once, this may come about as a consequence of streaming or scanning through a large amount of data. In either case, there is a good chance that the data has been accessed to the extent that it will be accessed in the near future, and so it can be concluded that the data should not be written back to a lower level cache.

In accordance with one aspect, there is provided a data processing apparatus comprising: a cache comprising a plurality of storage locations distributed into a first subset, a second subset and a third subset; allocation circuitry to determine a given location into which data can be stored and determine whether to store the data at the given location in dependence on: a first policy when the given location is in the first subset; a second policy when the given location is in the second subset; and a selected policy when the given location is in the third subset; and performance monitoring circuitry to monitor a performance of the first policy and the second policy, wherein the selected policy is whichever of the first policy and the second policy has a higher performance.

In the above aspect, a cache is separated into a number of sections (subsets). This may be based, for instance, on all or part of the addresses of data stored in the cache. The subsets need not be contiguous areas. Allocation circuitry determines where in the cache particular data can be stored. If the data would be stored in the area of the cache covered by the first subset then a first policy is applied to determine whether that data is to be stored. Similarly, if the data would be stored in the area of the cache covered by the second subset then a second policy is applied to determine whether that data is to be stored. The policy that is applied to the third subset is one of the first policy and the second policy. Whichever of these two policies to be applied at a particular moment in time is dependent on the performance of the first policy and the second policy. For instance the first policy will be used for the third subset if the first policy has achieved a higher performance for the first subset than the second policy has achieved for the second subset, and vice-versa.

There are a number of ways of measuring the performance. However, in some embodiments, the performance of the first policy is based on a hit rate in the first subset; and the performance of the second policy is based on a hit rate in the second subset.

In some embodiments, the hit rate of the first policy and the hit rate of the second policy are relative to each other. By comparing the hit rates relative to each other, it is possible to perform a direct comparison and thereby determine which of the policies performs better.

In some embodiments, the performance of the first policy and the second policy is determined using a saturated counter. A saturated counter is one that has minimum and maximum values. By limiting the size of the saturated counter, it is possible to limit the maximum 'score' that each of the policies can achieve. This results in a situation where the policy need not underperform for an extended period of time before being switched out.

In some embodiments, the performance monitoring circuitry is adapted to change the saturated counter in one direction in response to a hit in the first subset; and the performance monitoring circuitry is adapted to change the saturated counter in another direction in response to a hit in the second subset. In this way each of the policies can be made to compete by pushing the counter in different particular direction when they perform well (i.e. when it a hit occurs). A value of the counter thereby indicates which of the two policies is the highest performing at a particular moment in time, i.e. by comparing the direction in which the counter has been pushed.

In some embodiments, the performance monitoring circuitry is adapted to change the saturated counter in one direction in response to a miss in the second subset; and the performance monitoring circuitry is adapted to change the saturated counter in another direction in response to a miss in the first subset. In such examples, rather than each policy pushing the counter in 'their' direction when they perform well, the counter is pushed in the direction of the opposite policy when they do badly (e.g. when a miss occurs).

In some embodiments, the performance monitoring circuitry is adapted to apply a weighting to data that is stored as a consequence of an explicit fetch over data that is stored as a consequence of a prefetch operation. Prefetch operations offer an effective reduction in memory latency, but are based on predictions and heuristic data that can be wrong. In contrast, explicitly requested data is data for which an explicit access request has been made. It therefore represents data that is known to be required. Consequently, it is far more important that explicitly requested data hits than prefetched (or proactively fetched data) hits. These embodiments recognise this importance and weight the different situations accordingly.

In some embodiments, a ratio of the weighting is between 2:1 and 4:1. For instance, where a counter is used, a hit on prefetched data in one subset would increase the counter by 1 whereas a hit on explicitly fetched data in the same subset would increase the counter by 2. A miss on prefetched data in one subset would decrease the counter by 1 whereas a miss on explicitly fetched data in the same subset would decrease the counter by 2.

In some embodiments, in response to a performance level exceeding an upper predetermined threshold, the allocation circuitry is adapted to determine whether to store the data at the given location in dependence on the first policy regardless of the given location. In such embodiments when the performance level reaches a certain point, it is appropriate to apply the first policy across all of the subsets (e.g. across the cache) rather than having separate policies for each subset.

In some embodiments, the performance level is the performance of the first subset. As above, the performance could be measured using, for instance, a hit rate in the first subset.

In some embodiments, the performance level is a performance of the cache, e.g. across the three subsets. Again, the performance could be measured based on a hit rate. An example of such a predetermined threshold is 56/64. For instance, for a saturated counter between 0 and 64, the counter indicates a preference towards the first policy of 56/64.

In some embodiments, in response to a performance level falling below a lower predetermined threshold, the allocation circuitry is adapted to determine whether to store the data at the given location in dependence on the second policy when the data is in the second subset or the third subset. As above, if the performance strongly indicates that one of the policies is performing particularly well then it may be appropriate to use that policy across the cache. In this case, however, the policy is applied to the second and third subsets while the first policy continues to be applied to the first subset. This makes it possible for the situation to 'reverse', e.g. if the performance of the first policy suddenly improves.

In some embodiments, the performance level is the performance of the first subset.

In some embodiments, the performance level is a performance of the cache. An example of a lower predetermined threshold could be 18/64, e.g. using a saturated counter between 0 and 64, the counter indicates a preference against the first policy of 18/64.

In some embodiments, the data is evicted from a further cache; the first policy is adapted to store the data; and the second policy is adapted to store data that on the condition that it has been accessed from the further cache more than once.

In accordance with one aspect, there is provided a data processing apparatus comprising: a cache; retrieval circuitry to retrieve data from storage circuitry and to store the data in the cache in association with an indicator of where the data was retrieved from; and control circuitry to evict the data from the cache and, in dependence on the indicator, store the data in a further cache.

When data is evicted from a cache, the decision of whether to store it in the further cache (e.g. to write it back) could be based on where the data originated from in the first place. In some cases, the location of the data could give a hint as to the importance of the data, its frequency of access, or the probability of that data being accessed again later. Consequently, such information can be used in order to base the decision of whether the write back the data to another cache. For instance, where the originating cache is a shared cache (e.g. shared between multiple processing cores), there is the data was present in the cache due to having been requested by another processing core. In this case, it could be appropriate to act as if the data had been accessed from the memory and therefore not write the data back to the (shared) cache when it becomes evicted.

In some embodiments, the further cache is downstream from the cache. In other embodiments, the further cache could be higher in the memory hierarchy than the cache. For instance, the further cache could be a level 1 or level 2 cache of a remote CPU. In such cases, the further cache is treated as being downstream (e.g. as if the data had been retrieved from a level 3 cache) since the data can be thought of as having been effectively retrieved from a shared resource such as a shared level 3 cache or from main memory.

In some embodiments, the storage circuitry comprises the further cache. In particular, where data was retrieved from a lower level cache as opposed to memory, this could be an indicator that the data was either recently requested or proactively fetched into memory in anticipation that it would be needed at the time that it was fetched. Consequently, it may be considered to be appropriate to cause the data to be written back to the cache so that it need not be fetched from data again—which could disrupt the purpose for which the data was initially retrieved.

In accordance with one aspect, there is provided a data processing apparatus comprising: a memory hierarchy comprising a first cache and a second cache; and request circuitry to receive a data access request for data stored in the memory hierarchy, wherein the data access request is passed through the memory hierarchy until the data access request can be satisfied; and the first cache comprises tracking circuitry to track an indication of the hit rate of the second cache.

In this way, access requests pass through the memory hierarchy until being satisfied (i.e. reaching a storage circuit that has the requested data). That storage circuit then returns the data. In these embodiments, one of the caches in the memory hierarchy tracks the hit rate of another cache in the memory hierarchy and thus can determine, statistically, how likely it is that the given cache will achieve a cache hit when a later access request is made. If it is determined that it is unlikely that a given lower level cache will contain requested data, then that cache could be bypassed in the future—thereby reducing traffic/bandwidth of the memory hierarchy.

In some embodiments, a response to the data access request includes an identifier of a cache that satisfied the data access request; and the tracking circuitry is adapted to track the indication of the hit rate of the second cache in dependence on the identifier. By 'tagging' a response to a data access request with the cache that satisfied the data access request, when the response is provided and passed back through the memory hierarchy, it is possible to track the hit rate of other caches in the hierarchy.

Particular embodiments will now be described with reference to the figures.

Figure 1:
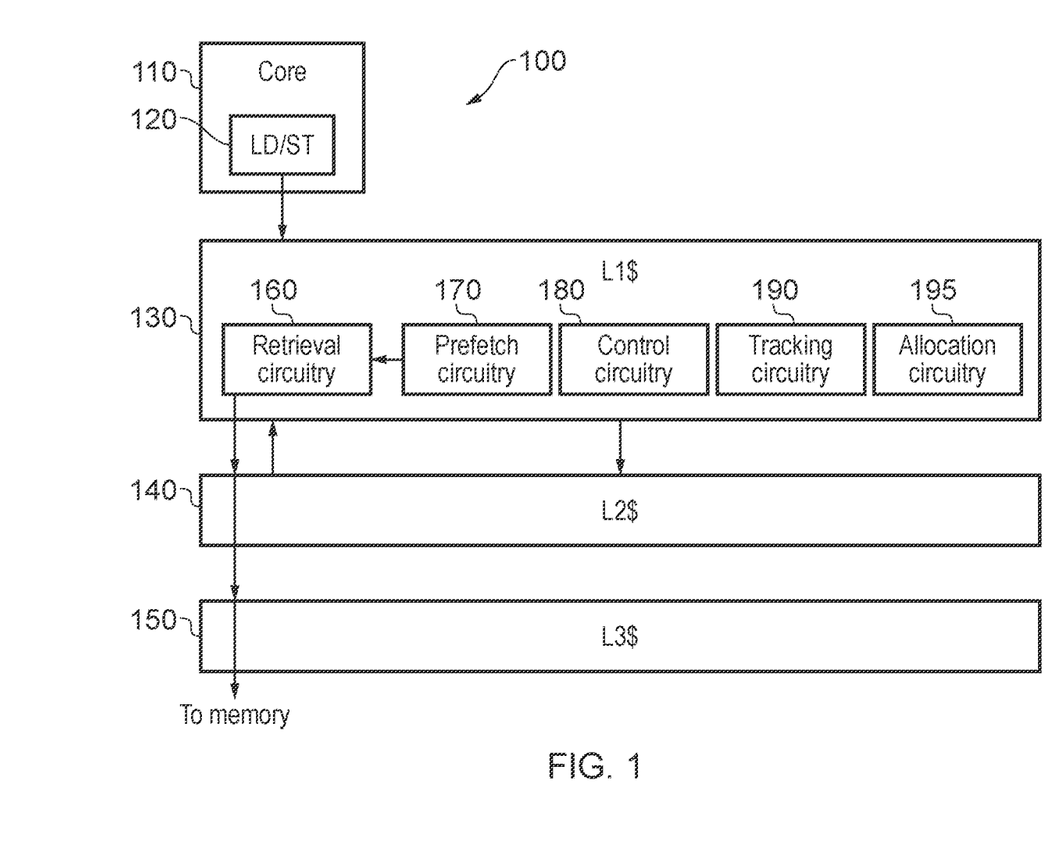
FIG. 1 schematically illustrates an apparatus in accordance with some embodiments.

FIG. 1 illustrates an apparatus 100 to which the present techniques may be applied. In particular, a core 110 is provided that executes one or more instructions in a stream of instructions. During the execution of these instructions, one or more requests may be made in order to retrieve data. These requests may be handled by a load/store unit 120. The requests are issued from the load/store unit 120 to a memory hierarchy. In this example, the memory hierarchy includes a level one cache 130, a level two cache 140, a level three cache 150, and a main memory (not shown in FIG. 1). Typically, the memory hierarchy is organised such that higher level caches are both smaller and quicker than lower level caches. However, even the lowest level cache (the level three cache 150) is smaller and faster than the main memory. One or more of the caches may either be dedicated to a particular core 110 or may be shared between multiple cores.

In FIG. 1, the level one cache 130 is shown to comprise retrieval circuitry 160 which is able to retrieve data from other caches or from main memory as appropriate. The level one cache 130 also includes prefetch circuitry 170. The prefetch circuitry 170 acts in combination with the retrieval circuitry 160 to retrieve data from the memory hierarchy that has not been explicitly requested as a consequence of an instruction executed by the load/store unit 120 of a core 110. This technique is known as prefetching and is used to effectively decrease the memory latency so that when data is finally requested, it has been pre-retrieved into one of the caches, 130, 140, 150 where it can be accessed more quickly than retrieving the data directly from the main memory. The level one cache 130 also includes control circuitry 180. In this example, the control circuitry 180 may be used in order to handle the process of eviction and/or writing back data to a lower level cache 140, 150. In addition, tracking circuitry 190 is provided that is able to track performance within the level one cache 130 and potentially within other caches 140, 150 as will be discussed with reference to the later figures. Allocation circuitry 195 is responsible for determining how data is to be stored within the level one cache 130 itself.

Figure 2:
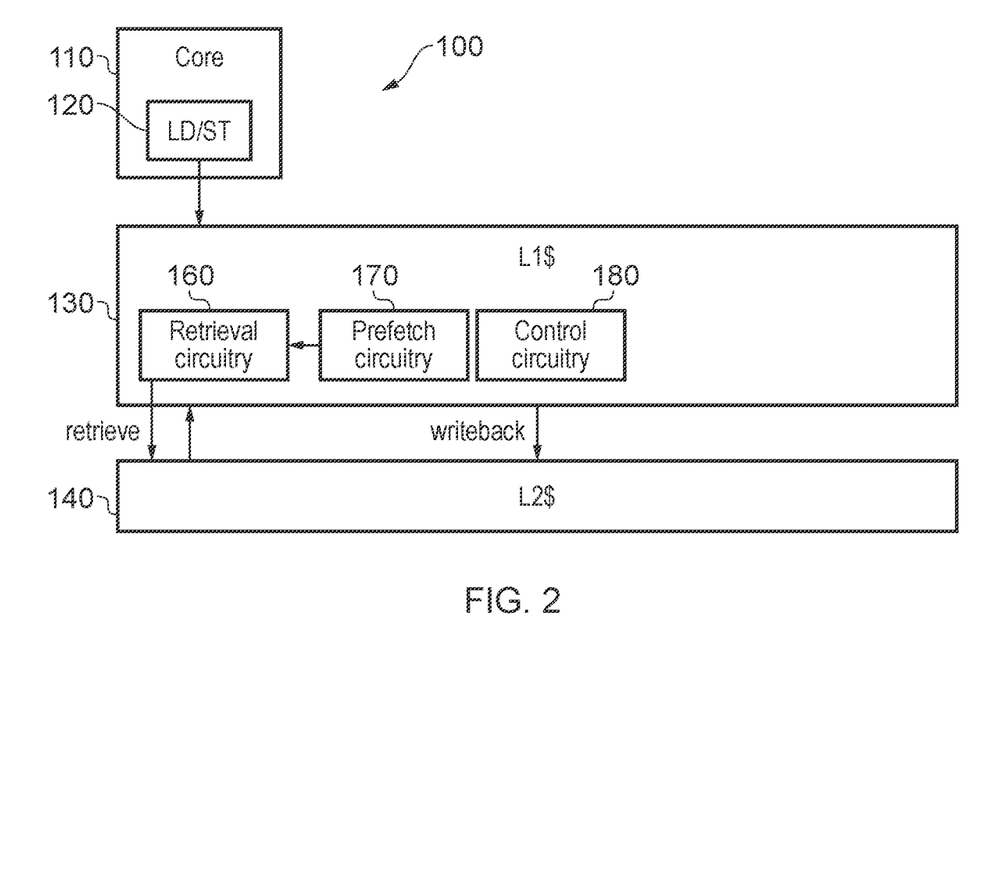
FIG. 2 schematically illustrates an apparatus in accordance with some embodiments.

FIG. 2 illustrates an example data processing apparatus 100 in accordance with some embodiments. The core 110 executes one or more instructions that utilise a load/store unit 120 in order to make memory accesses to a memory hierarchy including a level one cache 130 and a level two cache 140. During operation, the level one cache 130 performs retrieval on data. This data may have been explicitly requested as a consequence of an instruction executed by the core 110 or may be implicitly/proactively retrieved as a consequence of the prefetch circuitry 170 requesting that the data be retrieved into the level one cache via the retrieval circuitry 160. In either case, the data is retrieved for the level one cache 130 and stored therein. At some later time, the data is evicted by the control circuitry 180. This occurs as a consequence of the data not being accessed in the level one cache for a period of time or as a consequence of some other replacement/eviction policy. In any case, the decision must be made as to whether the data is to be written back to a lower level cache such as the level two cache 140. In such embodiments, the decision based on two factors—whether the data was prefetched and whether the data was accessed more than once. In this particular example, if the data was prefetched and only accessed zero or one times, then the data is not written back, otherwise the data is written back.

Figure 3:
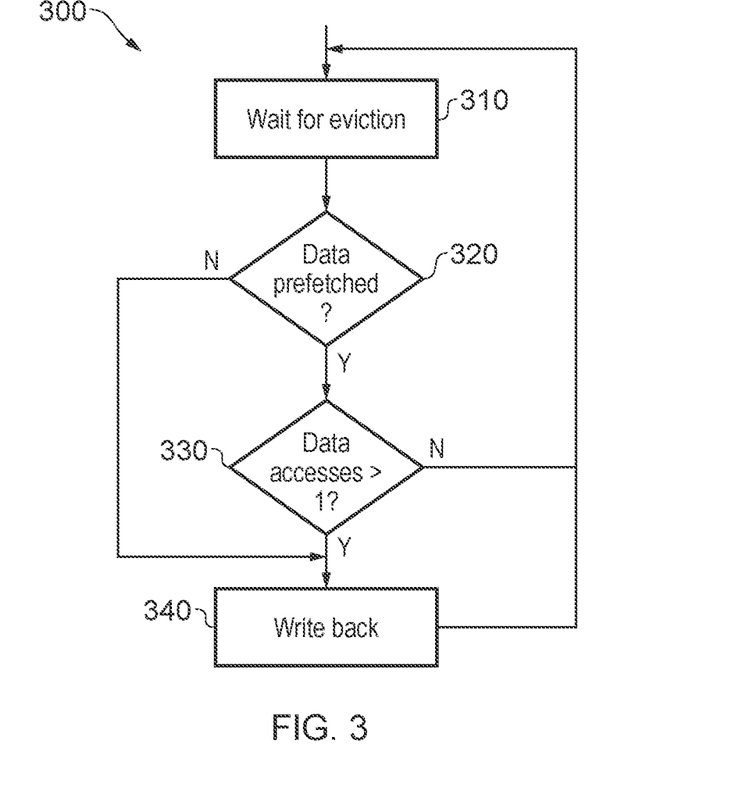
FIG. 3 illustrates an example of the decision of whether to write back data to a lower level cache in the form a flow chart in accordance with some embodiments.

FIG. 3 illustrates an example of the decision of whether to write back data to a lower level cache in the form a flow chart 300. At step 310, the cache 130 waits for a data eviction to occur. This may be managed by, for instance, control circuitry 180. Once an eviction of a particular piece of data is to take place, then at step 320, it is determined whether or not that data was initially fetched as the subject of a prefetch data request. Note that in this embodiment, the decision is based on how the data was initially fetched (e.g. prefetched or explicitly fetched). However, in other embodiments, the decision could be based on what other requests for the data (e.g. further prefetches or explicit requests) have been made. If the data was not initially fetched as part of a prefetch, then the data was explicitly requested, and at step 340, the data is written back to the lower level cache. This recognises the fact that if the data was explicitly requested then it is likely to be required again. Otherwise, at step 330, it is determined how many times the data was accessed from the cache after having been retrieved. If the number of data accesses is greater than one, then the data is written back to the lower level cache at step 340. This is because zero accesses would indicate that the data had been inappropriately prefetched, and one access would indicate a scan, seek, or stream operation that went through the data. In other cases, the data is more likely to be required again, and so a writeback occurs. Otherwise, the process returns to step 310 where the next eviction is waited for, i.e. the data is not written back. At step 340, having written the data back to the lower level cache, the process returns to step 310 where the next eviction is waited for. In the above method, bandwidths and memory traffic can be reduced by not writing the data back to a lower level cache in certain cases. In other cases or where the data was explicitly fetched, there is value to storing the data in a lower level cache so that it can be accessed again more quickly and it is either likely to be used again soon (if a number of data accesses is greater than one) or prefetch algorithms are unlikely to proactively fetch the data (if the data was initially explicitly accessed).

Figure 4:
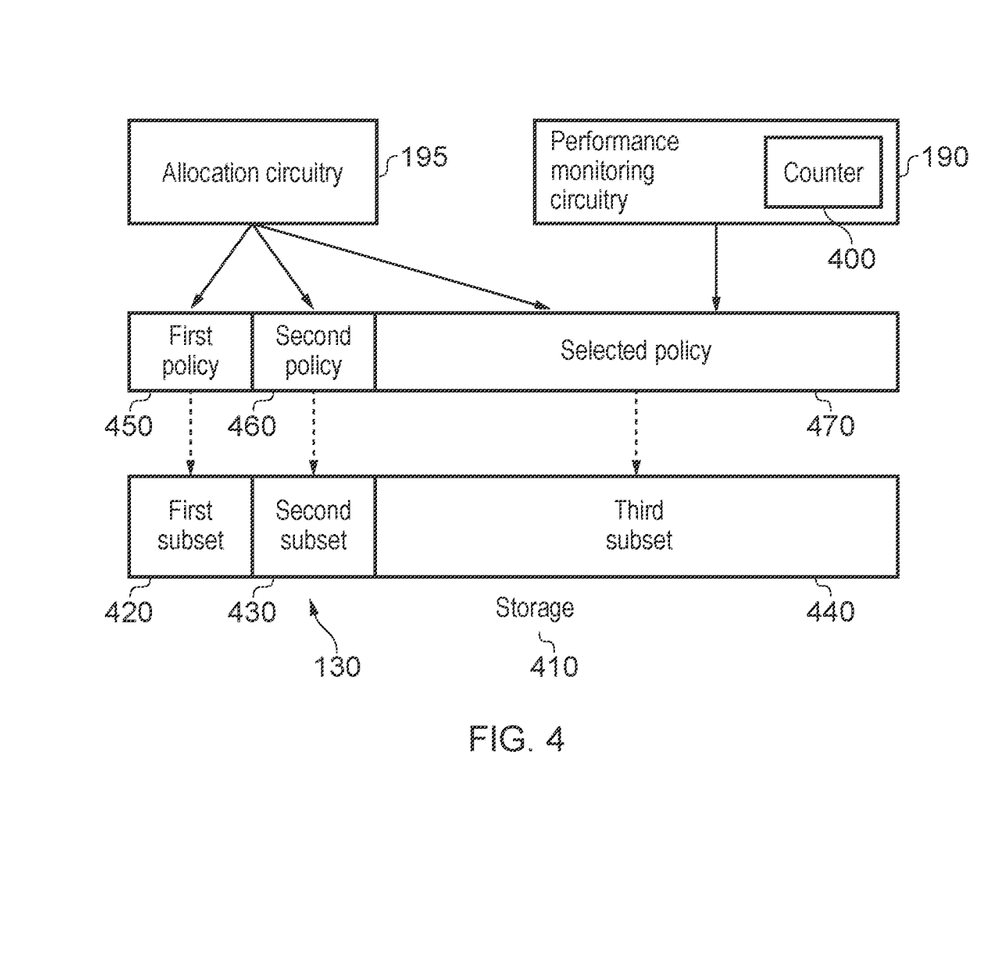
FIG. 4 illustrates an example of a further technique that may be applied in the data processing apparatus illustrated in FIG. 1, in accordance with some embodiments.

FIG. 4 illustrates an example of a further technique that may be applied in the data processing apparatus 100 illustrated in the FIG. 1. In this example, the technique is applied to the level one cache 130 although it could be extended to other varieties of cache as well. In this example, the cache 130 includes tracking circuitry that takes the form of performance monitoring circuitry 190. The performance monitoring circuitry 190 includes a counter 400, the cache 130 also includes allocation circuitry 195 that dictates where in the storage 410 the retrieved data is to be stored. The storage 410 is separated into three different subsets—a first subset 420, a second subset 420, and a third subset 440. In this example, each of the subsets are contiguous. However, this is not a requirement of the present technique. Furthermore, in this example, the third subset is significantly larger than the first subset 420 and the second subset 430. This is not essential and in other embodiments, the distribution could be different and each subset could be similarly sized. Each of the three subsets 420, 430, 440 can be defined according to particular addresses at the start and end of each of the subsets. The allocation circuitry 195 determines which area of the storage 410 particular data is to be stored in. There are a number of techniques that can be used for this and these will be known to the skilled person. However, one technique is based on a hash of the address at which the underlying data is stored in the main memory, such as considering the least significant bits of that address. If the data being considered for storage would be stored within the first subset 420, then a first policy 450 is applied to determine whether the data will be stored. If the data being considered for storage would be stored within the second subset 430, then a second policy 460 (different from the first policy) is applied to determine whether the data will be stored. If the data being considered for storage would be stored in the third subset 440 then a selected policy 470 (one of the other policies) is applied to determine whether the data will be stored. In this way, each of the first policy and the second policy can be tested in on part of the storage, with a better performing one of these being used for the rest of the storage (the third subset). The performance monitoring circuitry 190 uses the counter 400 to determine which of the other policies is used as the selected policy 470. Consequently it is possible to "duel" each of the first policy 450 and the second policy 460 to determine which is most effective, and to use the most effective of these policies as the selected policy 470. The operation counter 400 will be shown with reference to FIGS. 5 to 7.

Figure 5:
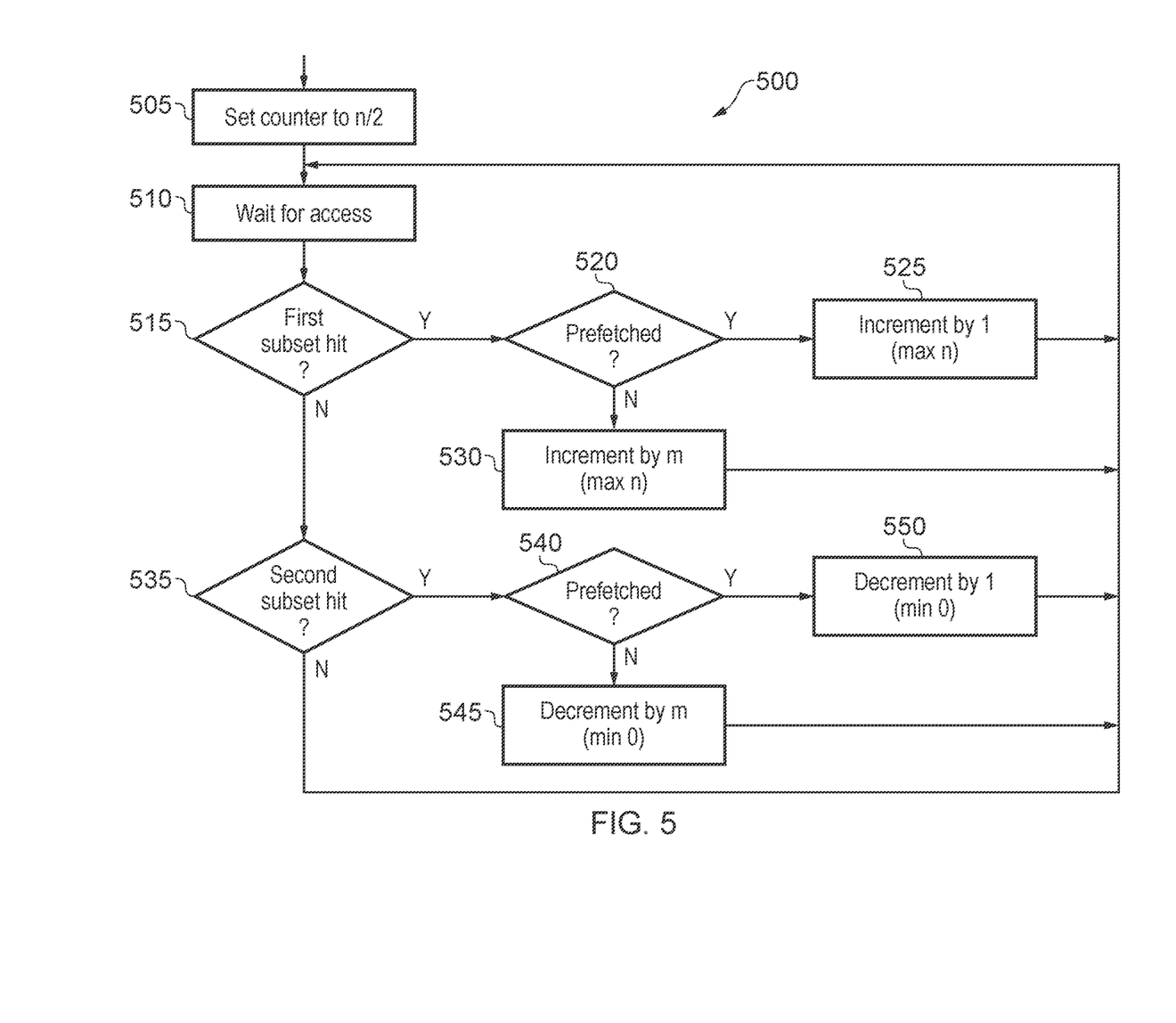
FIG. 5 shows a flow chart that illustrates a method of operating the counting in accordance with some embodiments.

FIG. 5 illustrates a method of operating the counter 400 for duelling the two policies in the form of a flow chart 500. At a step 505, the counter is set to value N/2 where N is the maximum value of the counter. Note that where N is an odd number, the value will be set to either the ceiling or the floor of N/2. This represents the situation which the counter is not strongly directed to either of the policies. Step 510 waits for the next access (either explicit or proactive/prefetch) to occur. At a step 515 it is determined whether the access that occurs relates to the first subset 120. If so, then at step 520 it is determined whether the address of that data was the subject of a prefetch request or not. If so, then the counter 400 is incremented by 1 (up to a maximum of N) at step 525 and the process returns to step 510. If not, then the counter is incremented by M (again up to a maximum of N), and the process returns to step 510. This branch from step 515 represents a swing towards the use of the first policy 150 but manages the first subset 420 for the selected policy 470 to manage the third subset 440. The counter is incremented less for a piece of data which has been prefetched as compared to a piece of data that has been explicitly requested in order to emphasise the importance of data that has been explicitly requested as opposed to the importance of data that has been guessed as being necessary. If, at step 515, there is no hit in the first subset, then at step 535 it is determined whether there is a hit in the second subset. If not, then the process returns to step 510 without the counter being adjusted. If so, then at step 540 it is determined whether the access data was part of a prefetch operation or not. If so, then the counter is decremented by one (down to a minimum of zero) and the process returns to step 510. If not, then the counter is decremented by M (again down to a minimum of zero), and the process returns to step 510. This branch from the step 535 represents the situation in which there is a hit in the second subset 430, which therefore causes a swing in the counter 400 to point to the use of the second policy 460 to manage the third subset 440. Accordingly, it can be seen that the counter 400 is moved in one direction in response to success in relation to the first policy 450 operating on the first subset 420, and is moved in the opposite direction in response to the success in the use of the second policy 460 in respect of the second subset 430. A value of the counter thereby indicates which of the first policy 450 and the second policy 460 is used for the selected policy 470. M could, for instance, be a value between 2 and 4 (inclusive), such as 3.

Figure 6:
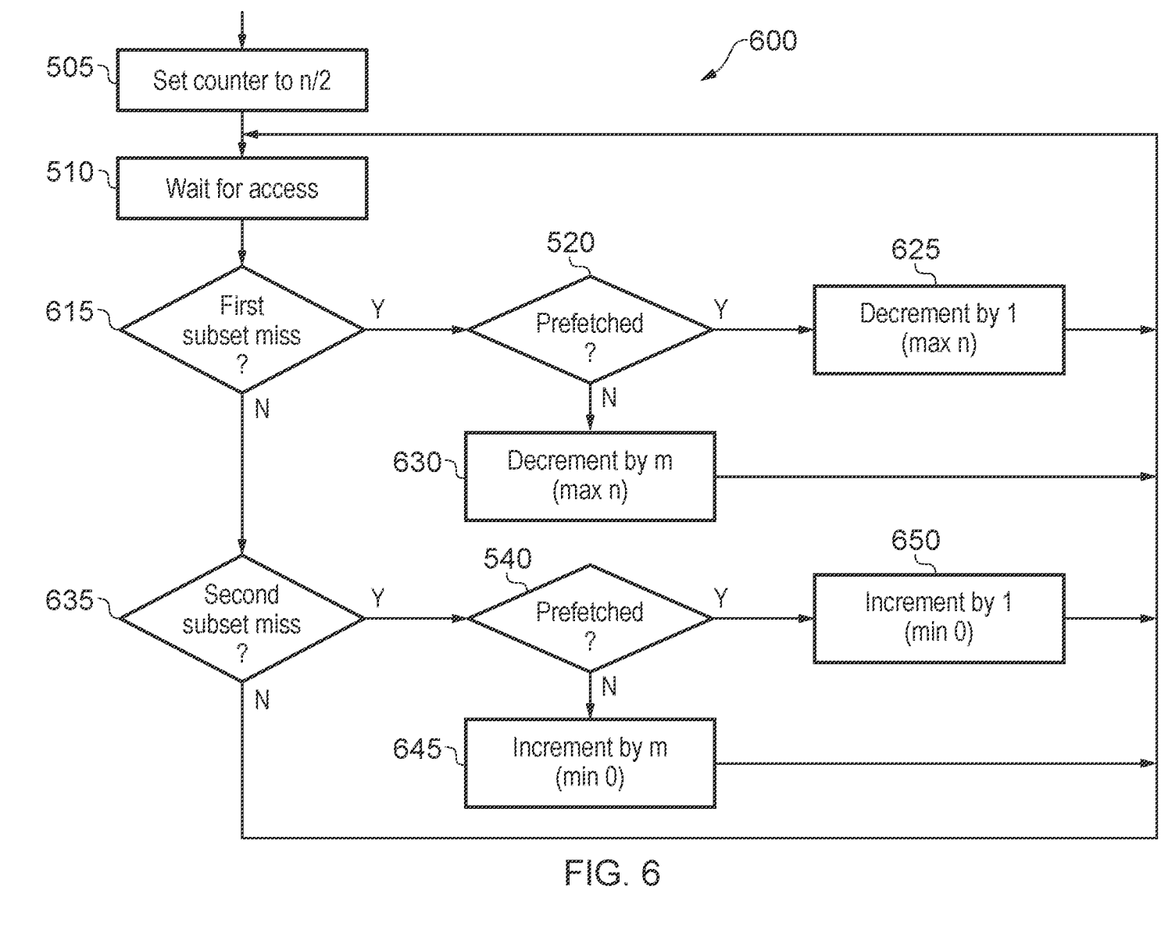
FIG. 6 shows a flow chart that illustrates an alternative method of operating the counting in accordance with some embodiments.

FIG. 6 illustrates an alternative method in the form of a flow chart 600. This method is similar to the method illustrated with respect to FIG. 5. However, at step 615 it is determined whether a miss occurs at the first subset. Similarly, at step 635, it is determined whether a miss occurs in the second subset. The test is therefore inverted as opposed to the method illustrated with respect to FIG. 5. Consequently, at step 625 and step 630 the counter is decremented. Similarly, at step 650 and 645, the counter is incremented. As with the method illustrated with respect to FIG. 5, the counter is moved in different directions depending on the success or failure of one of the two policies 450, 460. The counter therefore indicates a relative success rate between each of the two policies 450, 460—and therefore indicates which of these two policies 450, 460 should be used for the selected policy 470.

It will be appreciated that this process of "set duelling" can be extended to further policies beyond a first policy and a second policy. Clearly, however, a more complicated structure than the counter 400 that has been illustrated would be necessary. For instance, separate counters could be provided for each of the different policies, which are incremented or decremented based on the success or failure rate of the associated policy, and the policy with the highest counter value could be used as the selected policy 470. Other ways of comparing the relative success rate of each of the policies will be known to the skilled person.

Figure 7:
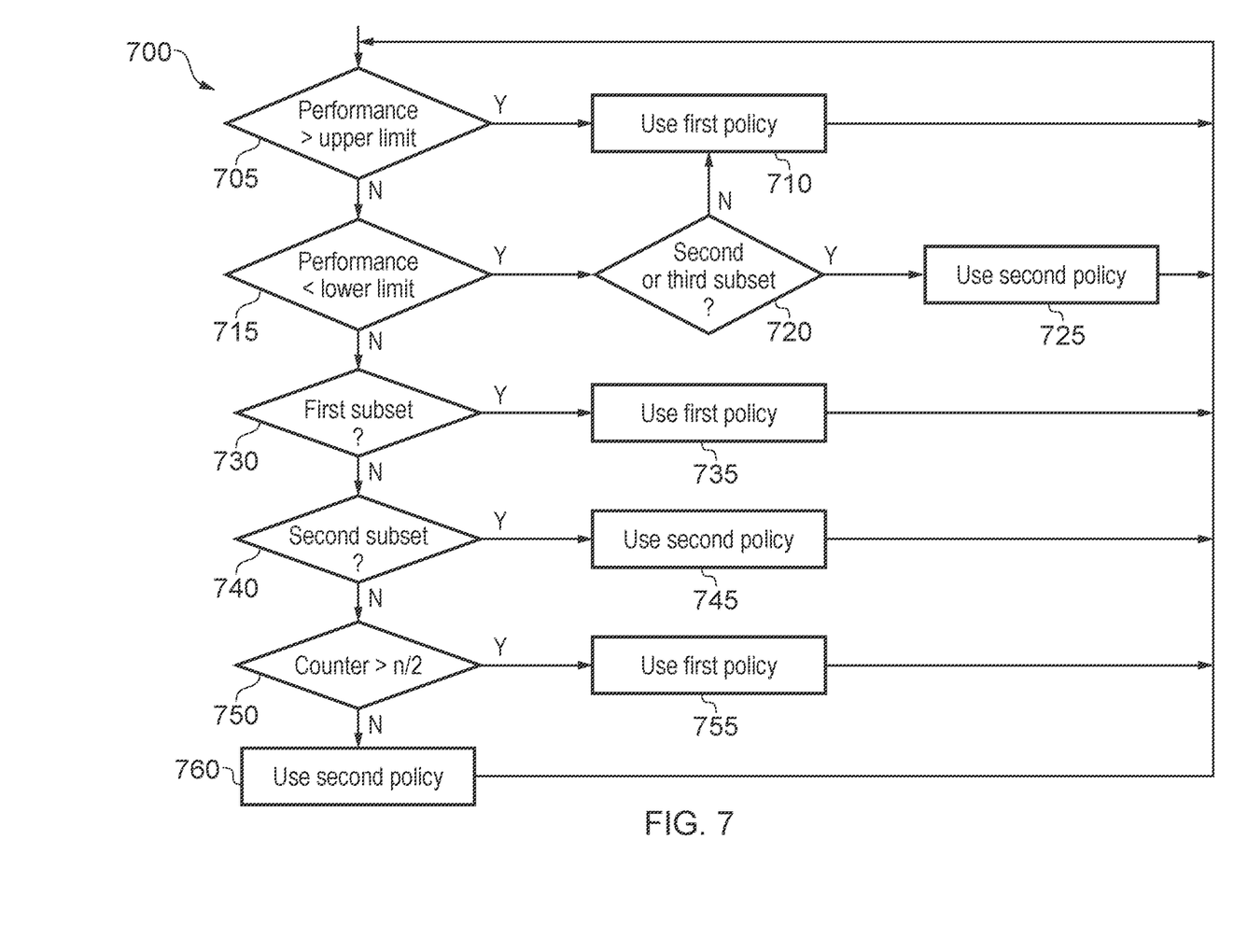
FIG. 7 illustrates a flow chart that shows a method of determining which policy to use, in accordance with some embodiments.

FIG. 7 illustrates a process of using the counter 400 to determine which policy to apply in the form of a flow chart 700. At a step 705, it is determined whether an overall performance is above an upper limit or not. The overall performance may be based on a hit rate across the entirety of the storage circuitry 410, or may exclude part of the overall storage 410 such as the first subset 420. In this case, if the upper limit is met, then at step 710, the first policy 450 is used. This occurs regardless of where in storage 410 the particular access request is directed. The process then returns to step 705. If the performance is not above the upper limit at step 705, then at step 715 it is determined whether the performance is below a lower limit. If so, then at step 720 it is determined whether the access request is directed towards the second or third subset. If so, then the second policy 460 is used. If not, then the first policy 710 is used. In either case, the process then returns to step 705. In this way, if the overall performance of the apparatus is such that the first policy is doing particularly well, then the first policy will be used throughout the storage 410. The same applies to the second policy 460. However, in order to allow for the first policy to improve, this does not take place in respect of the first subset 120. If the overall performance is determined to be between the upper and lower limits, then at step 730 it is determined whether the access is directed towards the first subset 120. If so, then at step 735, the first policy 450 is applied and the process returns to step 705. If the first subset 120 is not being used at step 730, then at step 740 it is determined whether the access request is directed towards the second subset 430. If so, then at step 745 the second policy 460 is used and the process returns to step 705. If the access request is not directed towards the second subset at step 740, then at step 750 it is concluded that the request must be directed towards the third subset. Consequently, the counter 400 is examined and it is determined whether the counter value is above N/2. If so, then at step 755 the first policy 150 is used. Otherwise, at step 760, the second policy 460 is used. In either case, the process returns to step 705. Accordingly, steps 730 to 760 represent the situation in which for each of the two duelling subsets, the first policy or the second policy is used as appropriate. In the case of the selected subset, the policy to be used depends on the value of the counter.

Figure 8:
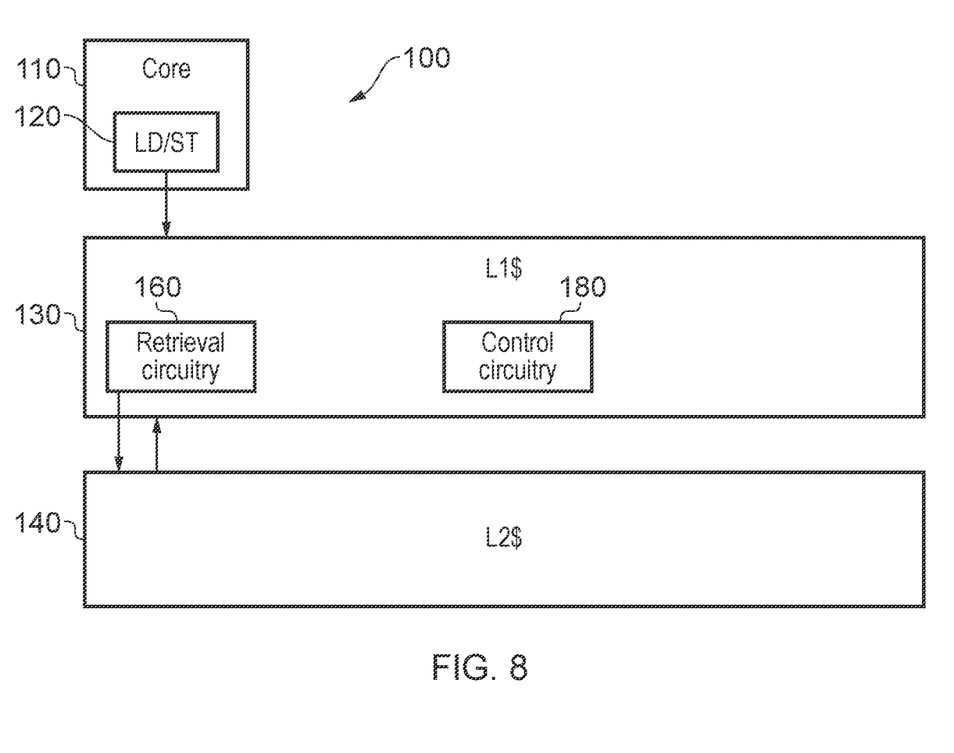
FIG. 8 illustrates a technique in which the location from which data is fetched is stored and used as part of the writeback decision.

FIG. 8 illustrates embodiments of the data processing apparatus 100 in which the location from which data is fetched is stored and is used as part of a decision as to whether a write back operation occurs or not. As before, the core 110 uses a load/store unit 120 in order to issue memory access requests to a cache hierarchy. In this case, the cache hierarchy includes a level one cache 130 and a level two cache 140. Retrieval circuitry 160 is provided in order to enable the level one cache 130 to obtain data from a lower level cache such as the level two cache 140. Note that the level one cache 130 may not initially be aware of where the data is ultimately accessed from, since the data might not be in the level two cache and might have to be fetched from main memory. However, once the data has been accessed and returned to the level one cache, it is stored in the level one cache 130 together with an indicator that indicates where in the memory hierarchy the data was obtained from. When the data is to be evicted by the control circuitry 180 the control circuitry considers this location. Based on the indication, a decision is made as to whether the data is to be written back to a lower level cache.

Figure 9:
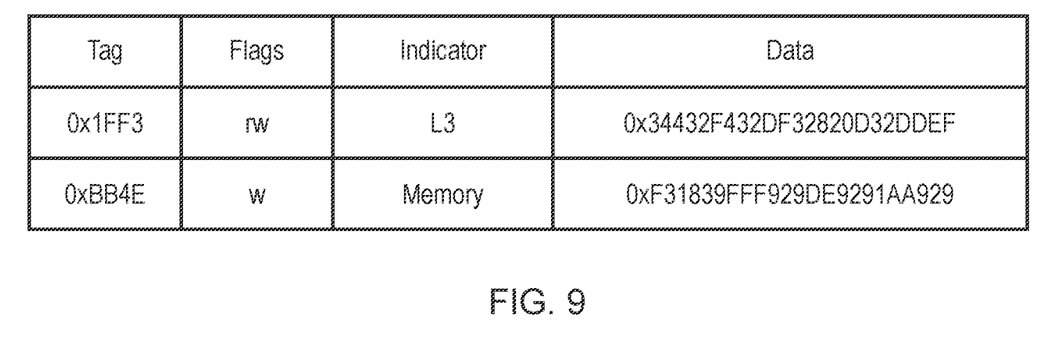
FIG. 9 illustrates a table that shows how the indicator can be stored in accordance with some embodiments.

FIG. 9 illustrates a table that shows how the indicator can be stored. The table includes a column that represents the tag associated with an item of data. This is used in the addressing process in order to locate a particular entry in the cache. A series of flags are provided that can be used to indicate permissions or the state of the data held in the particular cache line. The indicator is an indicator of where the data was originally fetched from. For instance, the first row of data in the table shown in FIG. 9 illustrates that the first data item was obtained from a level three cache. The second data line indicates that the second data item was retrieved from memory.

Figure 10:
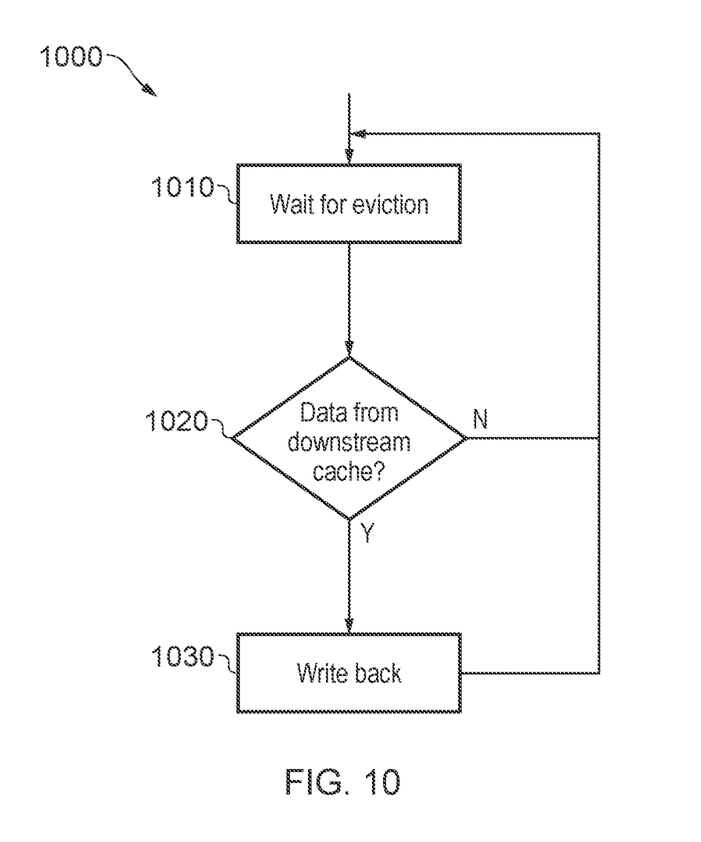
FIG. 10 illustrates a method of using the indicator in accordance with some embodiments.

FIG. 10 illustrates a method of using the indicator to determine whether the data is to be written back to a lower level cache or not. This is provided in the form of a flow chart 1000. At a step 1010, the data processing apparatus waits for an eviction to occur. When the eviction is to occur, at step 1020, it is determined whether the indicator indicates that the data was originally retrieved from a downstream cache relative to the current cache. In this example, this indicates whether the data was retrieved from a lower level cache as opposed to main memory. If not (e.g. if the data was retrieved from main memory or a higher level cache) then the process simply returns to step 1010. If the data was retrieved from a downstream cache, then at step 1030 the data is written back to a lower level cache. This could, for instance, be the cache from which the data was originally retrieved. This process recognises the fact that if the data was originally in a lower level cache, as opposed to main memory, then this may indicate that the data had previously been retrieved or had been deemed to be necessary. This clearly differs from the situation in which the data was retrieved from the main memory. Accordingly, if the data was previously indicated as being necessary or appropriate to be retrieved, then this could be an indicator that the data may remain relevant and should be stored back to a cache rather than being provided straight back to main memory. In this embodiment, it is assumed that data can only be retrieved from strictly downstream sources. However, in some embodiments, data could be retrieved from, for instance, the cache of a remote CPU. In such cases, the request for the data must permeate through lower level caches until, e.g. an interconnect or other structure is reached in which some kind of snoop protocol is used and the requested data can be located. Thus, in such embodiments, even though the data is actually retrieved from a higher level of the memory hierarchy, it is treated as being received from a downstream source such as a level 3 cache.

Figure 11:
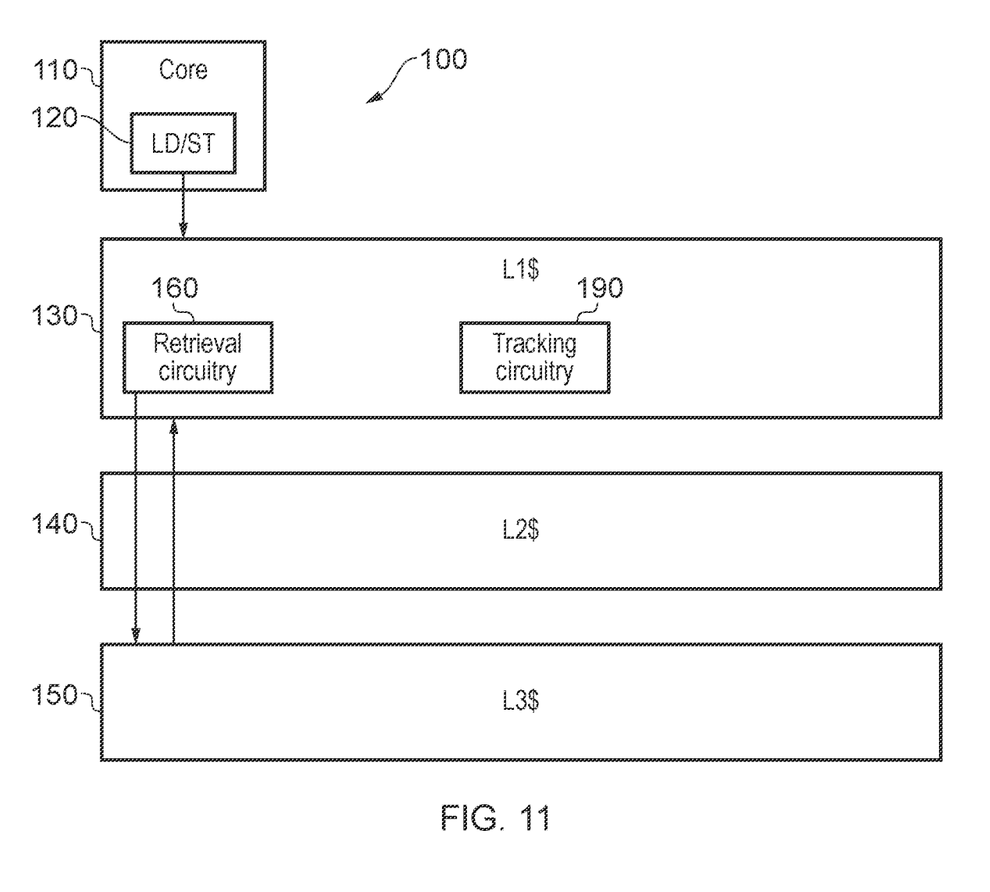
FIG. 11 schematically illustrates an apparatus in accordance with some embodiments.

FIG. 11 illustrates a data processing apparatus 100 in accordance with some embodiments. The core 110 issues access requests to the memory hierarchy via the load/store unit 120. Initially such requests are received by the level one cache 130 at the top of the memory hierarchy. The retrieval circuitry 160 of the level one cache 130 retrieves the data from elsewhere in the memory hierarchy if it is not already present in the level one cache 130. Once the data has been located, it is provided to the level one cache 130 together with an indicator of where in the memory hierarchy data was stored. The tracking circuitry 190 is used to track the success rate of each of the remaining caches 140, 150 at storing the requested data. For instance, the tracking circuitry 190 tracks a hit rate of each of the other caches 140, 150. In this way, the retrieval circuitry 160 can be made to limit the access requests that it makes of other caches 140, 150 if it is determined that the likelihood of data being stored in one of those caches (such as the level two cache 140) is low. This can be used in order to improve the usage of the memory bandwidth.

Figure 12:
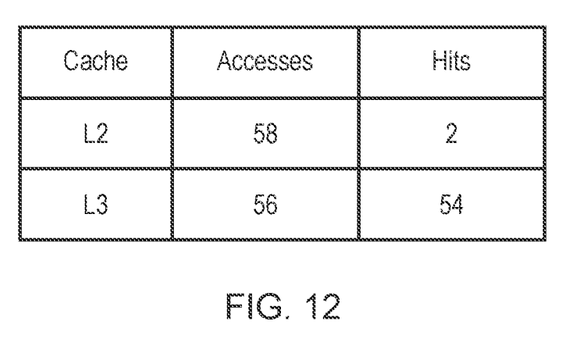
FIG. 12 illustrates an example table that is stored by the tracking circuitry in accordance with some embodiments.

FIG. 12 illustrates a table that may be stored by tracking circuitry 190. In this example the table comprises, for each of the other caches 140, 150, the number of accesses that have been made by the retrieval circuitry 160 of the level one cache and the number of hits that have occurred as a consequence of those accesses. Here, it can be seen that 58 accesses have been made to the level two cache 140, resulting in two hits. A smaller number of accesses (56) have been made to the level three cache 150. However, it can be seen that level three cache 150 has a significantly higher success rate since it has 54 hits. As percentages therefore, the level two cache 140 has a hit rate of 3.4%, while the level three cache 150 has a hit rate of 96%. In this example, if the success rate of a particular cache falls below a particular value (such as 10%) then accesses to that cache may be restricted. For instance, in the current situation, accesses to the level two cache 140 may be inhibited by the level one cache 130. In this way, the memory bandwidth that is used in order to obtain data from other parts of the memory hierarchy can be reduced where success is expected to be low. The inhibition may last for a period of time. For instance, the suspension could last for a period of time that is estimated to correspond to when the contents of the level two cache 140 have been refreshed and may become more relevant. Similarly, the hit rate of the level two cache 140 in this example could increase as a consequence of explicit access requests made to the level two cache 140 by the load/store unit 120.

Accordingly, the above techniques illustrate a number of ways in which caches in a memory hierarchy can be used in order to improve efficiency—particularly with respect to bandwidth and performance such as hit rates.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
a cache comprising a plurality of storage locations distributed into a first subset, a second subset and a third subset;
allocation circuitry to determine a given location into which data can be stored and determine whether to store the data at the given location in dependence on:
a first policy when the given location is in the first subset;
a second policy when the given location is in the second subset; and
a selected policy when the given location is in the third subset; and
performance monitoring circuitry to monitor a performance of the first policy and the second policy, wherein the selected policy is whichever of the first policy and the second policy has a higher performance;
in response to a performance level exceeding an upper predetermined threshold, the allocation circuitry is adapted to determine whether to store the data at the given location in dependence on the first policy regardless of the given location; and/or
in response to a performance level falling below a lower predetermined threshold, the allocation circuitry is adapted to determine whether to store the data at the given location in dependence on the second policy when the data is in the second subset or the third subset.

2. A data processing apparatus according to claim 1, wherein
the performance of the first policy is based on a hit rate in the first subset; and
the performance of the second policy is based on a hit rate in the second subset.

3. A data processing apparatus according to claim 2, wherein
the hit rate of the first policy and the hit rate of the second policy are relative to each other.

4. A data processing apparatus according to claim 1, wherein
the performance of the first policy and the second policy is determined using a saturated counter.

5. A data processing apparatus according to claim 4, wherein
the performance monitoring circuitry is adapted to change the saturated counter in one direction in response to a hit in the first subset; and
the performance monitoring circuitry is adapted to change the saturated counter in another direction in response to a hit in the second subset.

6. A data processing apparatus according to claim 4, wherein
the performance monitoring circuitry is adapted to change the saturated counter in one direction in response to a miss in the second subset; and
the performance monitoring circuitry is adapted to change the saturated counter in another direction in response to a miss in the first subset.

7. A data processing apparatus according to claim 4, wherein
the performance monitoring circuitry is adapted to apply a weighting to data that is stored as a consequence of an explicit fetch over data that is stored as a consequence of a prefetch operation.

8. A data processing apparatus according to claim 7, wherein
a ratio of the weighting is between 2:1 and 4:1.

9. A data processing apparatus according to claim 1, wherein
the performance level is the performance of the first subset.

10. A data processing apparatus according to claim 1, wherein
the performance level is a performance of the cache.

11. A data processing apparatus comprising:
a cache comprising a plurality of storage locations distributed into a first subset, a second subset and a third subset;
allocation circuitry to determine a given location into which data can be stored and determine whether to store the data at the given location in dependence on:
a first policy when the given location is in the first subset;
a second policy when the given location is in the second subset; and
a selected policy when the given location is in the third subset; and
performance monitoring circuitry to monitor a performance of the first policy and the second policy, wherein
the selected policy is whichever of the first policy and the second policy has a higher performance, wherein
the data is evicted from a further cache;
the first policy is adapted to store the data; and
the second policy is adapted to store data on the condition that it has been accessed from the further cache more than once.

12. A method of using a cache comprising a plurality of storage locations distributed into a first subset, a second subset and a third subset, the method comprising:
determining a given location into which data can be stored;
determining whether to store the data at the given location in dependence on:
a first policy when the given location is in the first subset;
a second policy when the given location is in the second subset; and
a selected policy when the given location is in the third subset; and
monitoring a performance of the first policy and the second policy, wherein
the selected policy is whichever of the first policy and the second policy has a higher performance;
in response to a performance level exceeding an upper predetermined threshold, it is determined whether to store the data at the given location in dependence on the first policy regardless of the given location; and/or
in response to a performance level falling below a lower predetermined threshold, it is determined whether to store the data at the given location in dependence on the second policy when the data is in the second subset or the third subset.

* * * * *